US012390855B2

(12) United States Patent
Sonderegger et al.

(10) Patent No.: US 12,390,855 B2
(45) **Date of Patent: *Aug. 19, 2025**

(54) METHOD FOR PRODUCING A GREEN BODY AND METHOD FOR FURTHER PROCESSING THE GREEN BODY INTO A MACHINING SEGMENT FOR THE DRY MACHINING OF CONCRETE MATERIALS

(71) Applicant: Hilti Aktiengesellschaft, Schaan (LI)

(72) Inventors: Marcel Sonderegger, Balgach (CH); Cliff Toldo, Vaduz (LI)

(73) Assignee: Hilti Aktiengesellschaft, Schaan (LI)

(*) Notice: Subject to any disclaimer, the term of this patent is extended or adjusted under 35 U.S.C. 154(b) by 268 days.

This patent is subject to a terminal disclaimer.

(21) Appl. No.: 17/415,289

(22) PCT Filed: Dec. 21, 2019

(86) PCT No.: PCT/EP2019/086882

§ 371 (c)(1),
(2) Date: Jun. 17, 2021

(87) PCT Pub. No.: WO2020/128085

PCT Pub. Date: Jun. 25, 2020

(65) Prior Publication Data

US 2022/0055248 A1 Feb. 24, 2022

(30) Foreign Application Priority Data

Dec. 21, 2018 (EP) .................................... 18215548
Dec. 21, 2018 (EP) .................................... 18215606

(51) Int. Cl.
*B28B 3/02* (2006.01)
*B22F 3/14* (2006.01)
(Continued)

(52) U.S. Cl.
CPC .................. *B22F 3/14* (2013.01); *B22F 5/00* (2013.01); *B22F 7/06* (2013.01); *B28B 3/025* (2013.01);
(Continued)

(58) Field of Classification Search
CPC .......... B22F 2005/001; B22F 2005/005; B22F 7/06; B22F 7/08; B24D 18/0009; B24D 2203/00
See application file for complete search history.

(56) References Cited

U.S. PATENT DOCUMENTS 5,620,489 A 4/1997 Tselesin
6,045,750 A 4/2000 Drake et al.
(Continued)

FOREIGN PATENT DOCUMENTS

EP 2 745 965 A1 6/2014
EP 2 745 966 A1 6/2014
KR 20030027434 A 4/2003

OTHER PUBLICATIONS

PCT/EP2019/086882, International Search Report dated Jan. 28, 2020 (Two (2) pages).
(Continued)

*Primary Examiner* — Sally A Merkling
*Assistant Examiner* — Sean P. O'Keefe
(74) *Attorney, Agent, or Firm* — Crowell & Moring LLP

(57) ABSTRACT

A method for producing a green body for a machining segment, where the machining segment is connectable to a basic body of a machining tool by an underside of the machining segment, includes placing first hard material particles in respective depressions of a first press punch in a defined particle pattern and applying a first matrix material to the placed first hard material particles.

8 Claims, 6 Drawing Sheets

(51) Int. Cl.
*B22F 5/00* (2006.01)
*B22F 7/06* (2006.01)

(52) U.S. Cl.
CPC ... *B22F 2005/001* (2013.01); *B22F 2005/005* (2013.01)

(56) References Cited

U.S. PATENT DOCUMENTS

| | | | | |
|---|---|---|---|---|
| 6,626,167 | B2 | 9/2003 | Kim et al. | |
| 2003/0089364 | A1* | 5/2003 | Kim | B28D 1/041 451/541 |
| 2011/0056143 | A1* | 3/2011 | Sheridan | B24D 18/00 51/303 |
| 2012/0005966 | A1 | 1/2012 | Cleboski et al. | |
| 2014/0231151 | A1 | 8/2014 | Matthias et al. | |
| 2015/0151362 | A1* | 6/2015 | Olofsson | B22F 3/003 51/307 |
| 2016/0121516 | A1* | 5/2016 | Bolander | B22F 3/02 264/109 |
| 2022/0023945 | A1* | 1/2022 | Sonderegger | B22F 3/15 |
| 2022/0055105 | A1* | 2/2022 | Sonderegger | B22F 7/062 |
| 2022/0055106 | A1* | 2/2022 | Sonderegger | B28D 1/041 |
| 2022/0055107 | A1* | 2/2022 | Sonderegger | B22F 7/08 |
| 2022/0055108 | A1* | 2/2022 | Sonderegger | B22F 7/062 |
| 2022/0055109 | A1* | 2/2022 | Sonderegger | B22F 7/062 |
| 2022/0055110 | A1* | 2/2022 | Sonderegger | B22F 7/02 |
| 2022/0055183 | A1* | 2/2022 | Sonderegger | B23D 61/04 |
| 2022/0055184 | A1* | 2/2022 | Sonderegger | B28D 1/041 |

OTHER PUBLICATIONS

U.S. Patent Application, “Method for Producing a Machining Segment for the Dry Machining of Concrete Materials”, filed Jun. 17, 2021, first named inventor Marcel Sonderegger.

U.S. Patent Application, “Machining Segment for a Machining Tool”, filed Jun. 17, 2021, first named inventor Marcel Sonderegger.

U.S. Patent Application, “Machining Segment for the Dry Machining of Concrete Materials”, filed Jun. 17, 2021, first named inventor Marcel Sonderegger.

U.S. Patent Application, “Method for Producing a Green Body and Method for Further Processing the Green Body Into a Machining Segment for the Dry Machining of Concrete Materials”, filed Jun. 17, 2021, first named inventor Marcel Sonderegger.

* cited by examiner

METHOD FOR PRODUCING A GREEN BODY AND METHOD FOR FURTHER PROCESSING THE GREEN BODY INTO A MACHINING SEGMENT FOR THE DRY MACHINING OF CONCRETE MATERIALS

BACKGROUND AND SUMMARY OF THE INVENTION

The present invention relates to a method for producing a green body and to a method for further processing a green body into a machining segment.

Machining tools, such as core drill bits, saw blades, abrasive disks and cut-off grinding chains, comprise machining segments that are attached to a tubular, disk-shaped or annular basic body, wherein the machining segments are connected to the basic body by welding, soldering or adhesive bonding. Depending on the machining method of the machining tool, machining segments that are used for core drilling are referred to as drilling segments, machining segments that are used for sawing are referred to as sawing segments, machining segments that are used for abrasive removal are referred to as abrading segments and machining segments that are used for cut-off grinding are referred to as cut-off grinding segments.

Machining segments for core drill bits, saw blades, abrasive disks and cut-off grinding chains are produced from a matrix material and hard material particles, where the hard material particles can be randomly distributed or arranged according to a defined particle pattern in the matrix material. In the case of machining segments with randomly distributed hard material particles, the matrix material and the hard material particles are mixed and the mixture is poured into a suitable mold and further processed to form the machining segment. In the case of machining segments with set hard material particles, a green body is built up in layers from matrix material, in which the hard material particles are placed according to the defined particle pattern. In the case of machining segments that are welded to the basic body of the machining tool, the structure comprising a machining zone and a neutral zone has proven to be successful. The machining zone is built up from a first matrix material and the neutral zone is built up from a second matrix material, which is different from the first matrix material.

Machining tools that are designed as a core drill bit, saw blade, abrasive disk or cut-off grinding chain and are intended for the wet machining of concrete materials are only suitable to a limited extent for the dry machining of concrete materials. In the wet machining of concrete materials, an abrasive concrete sludge is produced, which is conducive to the machining process and leads to a self-sharpening of the machining segments during the machining. The matrix material is removed by the abrasive drilling sludge and new hard material particles are exposed. In the dry machining of concrete materials, no abrasive drilling sludge that could be conducive to the drilling process can form. The hard material particles quickly become dull and the machining rate drops. Due to the lack of concrete sludge, the matrix material wears too slowly and deeper-lying hard material particles cannot be exposed. In the case of known machining tools for wet machining, the matrix material and the hard material particles have similar rates of wear.

The object of the present invention consists in developing a method for producing a green body for a machining segment with which machining segments which are suitable for the dry machining of concrete materials can be produced. It is intended here that the machining segment should have a high machining rate and as long a service life as possible in the dry machining of concrete materials.

The method for producing a green body for a machining segment which is connected by an underside to a basic body of a machining tool is characterized according to the invention in that the first hard material particles are placed in depressions of a first press punch, and the first matrix material is applied to the first hard material particles.

The concept of the present invention consists in reversing the buildup direction of the green body and building up the green body from the top down, that is to say from the upper side to the underside. The first hard material particles, which in the finished machining segment project on the upper side with respect to the first matrix material and machine the concrete material, are placed in the depressions of the first press punch. The first matrix material is applied to the placed first hard material particles, wherein the first matrix material can be applied in one layer or in a number of layers. The placement of the first hard material particles in the depressions of the first press punch increases the accuracy with which the first hard material particles can be arranged according to the defined particle pattern, and the risk that the first hard material particles deviate from their defined particle pattern is eliminated.

In a further development of the method, prior to placing the first hard material particles, a protective layer of the first matrix material is applied into the depressions of the first press punch. In order to reduce the wear of the first press punch, direct contact between the first hard material particles and the first press punch should be avoided. The application of the first matrix material into the depressions as a protective layer prevents direct contact between the first hard material particles and the first press punch and thus reduces the wear of the first press punch.

In an alternative further development of the method, prior to placing the first hard material particles, a protective layer of a second matrix material is applied into the depressions of the first press punch, wherein the second matrix material is different from the first matrix material. The application of the second matrix material into the depressions as a protective layer prevents direct contact between the first hard material particles and the first press punch and thus reduces the wear of the first press punch. When a second matrix material that is different from the first matrix material is used, matrix materials with different wear properties can be used. The second matrix material serves for protecting the first press punch when compacting the green body and should be able to be removed as quickly as possible from the finished machining segment in order to expose the first hard material particles that machine the base material. A second matrix material with a higher wear rate than the first matrix material can be removed quickly.

In a preferred variant, use is made of first hard material particles which are encased by a casing material, wherein the casing material corresponds to the first matrix material. The use of encased first hard material particles has the advantage that the first hard material particles do not come into direct contact with the first press punch, and the wear of the first press punch can be reduced.

In an alternative preferred variant, use is made of first hard material particles which are encased by a casing material, wherein the casing material is different from the first matrix material. The use of encased first hard material particles has the advantage that the first hard material particles do not come into direct contact with the first press punch, and the wear of the first press punch can be reduced. When a casing material that is different from the first matrix material is used, matrix materials with different wear properties can be used. The casing material serves for protecting the first press punch during compression or hot-pressing of the green body and should be able to be removed as quickly as possible from the finished machining segment in order to expose the first hard material particles which machine the base material. A matrix material having a higher wear rate than the first matrix material can be quickly removed.

In a further development, second hard material particles are admixed with the first matrix material, wherein an average particle diameter of the second hard material particles is less than an average particle diameter of the first hard material particles. Depending on the wear properties of the first matrix material, increased wear of the first matrix material on the lateral surfaces of the machining segment can occur during the machining of a base material with the machining tool as a result of friction with the base material. This wear can be reduced by the second hard material particles. The second hard material particles can be admixed with the first matrix material as randomly distributed particles, or the second hard material particles are placed in the first matrix material according to a defined second particle pattern. The second hard material particles are placed in particular in the region of the side surfaces of the machining segment.

The invention further relates to a method for further processing a green body, which has been produced by the method for producing the green body, into a machining segment which is connected by an underside to a basic body of a machining tool. A green body which has been produced by the method according to the invention for producing a green body is further processed by means of the first press punch, which forms the upper side of the machining segment, and a second press punch, which forms the underside of the machining segment, to form the machining segment. The first press punch, which has depressions for the first hard material particles in the pressing surface, ensures that the first hard material particles in the green body have the desired projection on the upper side and this projection is maintained during the further processing of the green body to form the machining segment. The first press punch is used both during the production of the green body and during the further processing of the green body by compression or hot-pressing.

In a preferred variant, the green body is compressed under the action of pressure between the first press punch, which forms an upper side, opposite from the underside, of the machining segment, and a second press punch, which forms the underside of the machining segment, to form a compact body, and the compact body is then further processed to form the machining segment. The use of the first press punch which has depressions for the first hard material particles in the pressing surface allows the green body to be compressed to form a compact body without the projection of the first hard material particles, which has been created in the green body, with respect to the first matrix material being removed.

In a preferred alternative variant, the green body is further processed by hot-pressing under the action of temperature and action of pressure between the first press punch, which forms an upper side, opposite from the underside, of the machining segment, and a second press punch, which forms the underside of the machining segment, to form the machining segment. The use of the first press punch which has depressions for the first hard material particles in the pressing surface allows the green body to be compressed to form a compact body without the projection of the first hard material particles, which has been created in the green body, with respect to the first matrix material being removed.

Exemplary embodiments of the invention are described hereinafter with reference to the drawings. This is not necessarily to show the exemplary embodiments to scale; rather the drawings, where useful for explanation, are produced in a schematic and/or slightly distorted form. It should be taken into account here that various modifications and alterations relating to the form and detail of an embodiment may be undertaken without departing from the general concept of the invention. The general concept of the invention is not limited to the exact form or the detail of the preferred embodiment shown and described hereinafter or limited to subject matter that would be limited compared to the subject matter claimed in the claims. For given dimensioning ranges, values within the stated limits should also be disclosed as limit values and can be used and claimed as desired. For the sake of simplicity, the same reference numerals are used below for identical or similar parts or parts with identical or similar functions.

DETAILED DESCRIPTION OF THE DRAWINGS

Figure 1A:
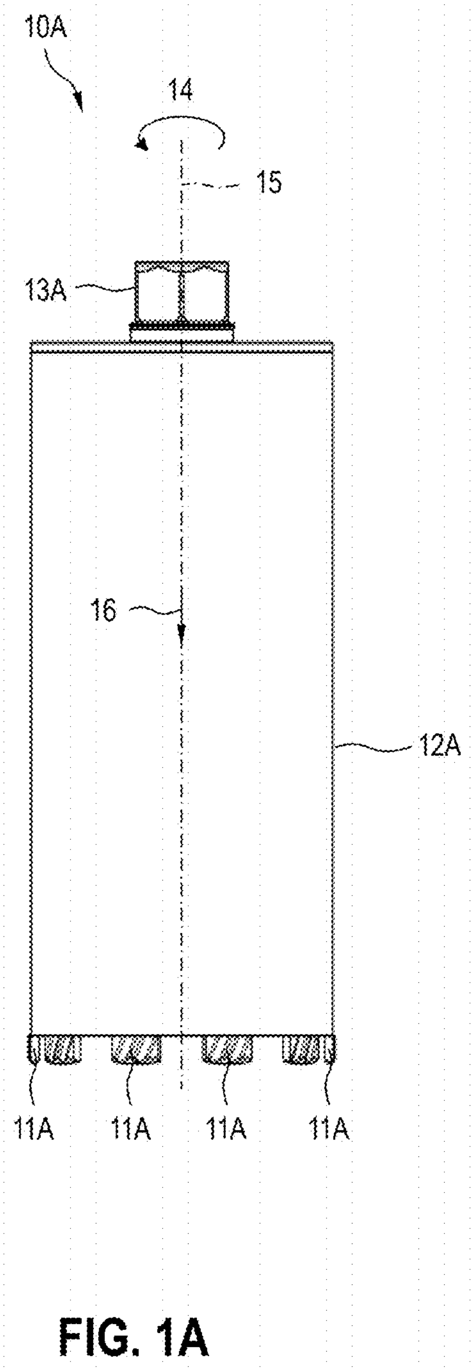
FIGS. 1A, 1B show two variants of a machining tool taking the form of a core drill bit.
Figure 1B:
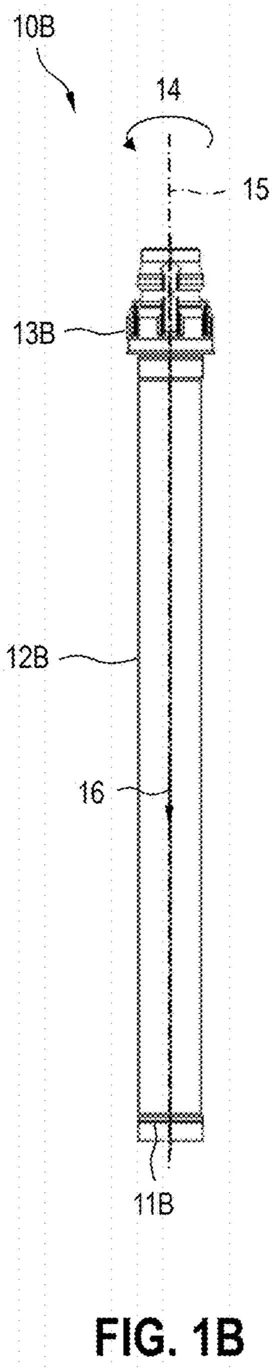

FIGS. 1A, 1B show two variants of a machining tool taking the form of a core drill bit 10A, 10B. The core drill bit 10A shown in FIG. 1A is referred to below as the first core drill bit, and the core drill bit 10B shown in FIG. 1B is referred to as the second core drill bit; in addition, the first and second core drill bits 10A, 10B are both included under the term “core drill bit”.

The first core drill bit 10A comprises a number of machining segments 11A, a tubular basic body 12A and a tool fitting 13A. The machining segments 11A, which are used for core drilling, are also referred to as drilling segments and the tubular basic body 12A is also referred to as a drilling shaft. The drilling segments 11A are fixedly connected to the drilling shaft 12A, for example by screwing, adhesive bonding, brazing or welding.

The second core drill bit 10B comprises an annular machining segment 11B, a tubular basic body 12B and a tool fitting 13B. The annular machining segment 11B, which is used for core drilling, is also referred to as a drilling ring, and the tubular basic body 12B is also referred to as a drilling shaft. The drilling ring 11B is fixedly connected to the drilling shaft 12B, for example by screwing, adhesive bonding, brazing or welding.

The core drill bit 10A, 10B is connected via the tool fitting 13A, 13B to a core drill and, in drilling operation, is driven by the core drill in a direction of rotation 14 about an axis of rotation 15. During the rotation of the core drill bit 10A, 10B about the axis of rotation 15, the core drill bit 10A, 10B is moved along a feed direction 16 into a workpiece to be machined, with the feed direction 16 running parallel to the axis of rotation 15. The core drill bit 10A, 10B creates a drill core and a borehole in the workpiece to be machined.

The drilling shaft 12A, 12B in the exemplary embodiment of FIGS. 1A, 1B is formed in one piece and the drilling segments 11A and the drilling ring 11B are fixedly connected to the drilling shaft 12A, 12B. Alternatively, the drilling shaft 12A, 12B may be of a two-piece form, composed of a first drilling shaft section and a second drilling shaft section, with the drilling segments 11A or the drilling ring 11B being fixedly connected to the first drilling shaft section, and the tool fitting 13A, 13B being fixedly connected to the second drilling shaft section. The first and second drilling shaft section are connected to one another via a releasable connection device. The releasable connection device takes the form for example of a plug-and-twist connection as described in EP 2 745 965 A1 or EP 2 745 966 A1. The formation of the drilling shaft as a one-piece or two-piece drilling shaft has no influence on the structure of the drilling segments 11A or of the drilling ring 11B.

Figure 2A:
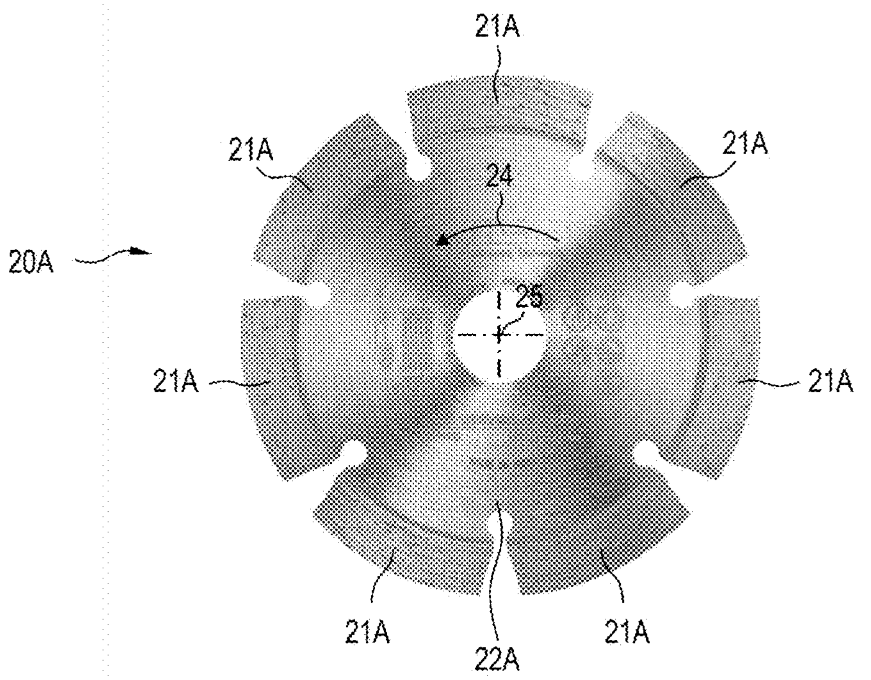
FIGS. 2A, 2B show two variants of a machining tool taking the form of a saw blade.
Figure 2B:
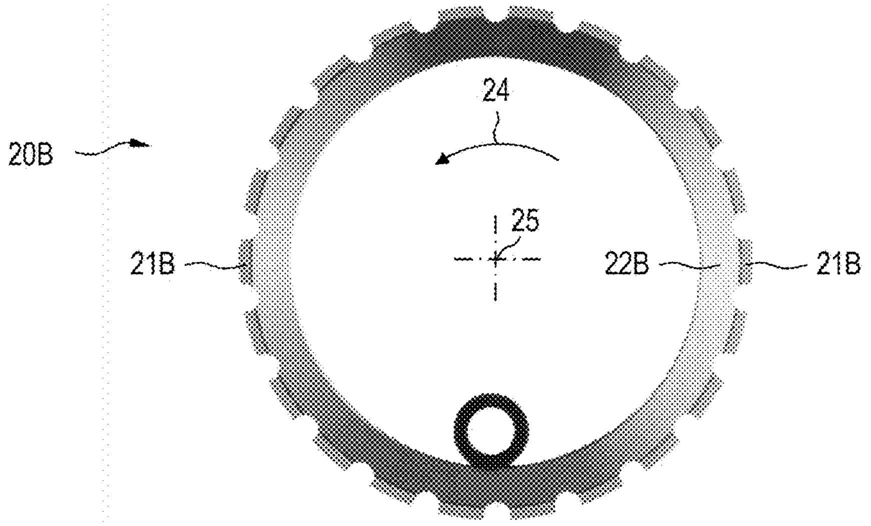

FIGS. 2A, 2B show two variants of a machining tool taking the form of a saw blade 20A, 20B. The saw blade 20A shown in FIG. 2A is referred to below as the first saw blade and the saw blade 20B shown in FIG. 2B is referred to as the second saw blade; in addition, the first and second saw blades 20A, 20B are both included under the term "saw blade".

The first saw blade 20A comprises a number of machining segments 21A, a disk-shaped basic body 22A and a tool fitting. The machining segments 21A, which are used for sawing, are also referred to as sawing segments, and the disk-shaped basic body 22A is also referred to as a blade body. The sawing segments 21A are fixedly connected to the blade body 22A, for example by screwing, adhesive bonding, brazing or welding.

The second saw blade 20B comprises a number of machining segments 21B, an annular basic body 22B and a tool fitting. The machining segments 21B, which are used for sawing, are also referred to as sawing segments and the annular basic body 22B is also referred to as a ring. The sawing segments 21B are fixedly connected to the ring 22B, for example by screwing, adhesive bonding, brazing or welding.

The saw blade 20A, 20B is connected to a saw via the tool fitting and, in sawing operation, is driven by the saw in a direction of rotation 24 about an axis of rotation 25. During the rotation of the saw blade 20A, 20B about the axis of rotation 25, the saw blade 20A, 20B is moved along a feed direction, the feed direction running parallel to the longitudinal plane of the saw blade 20A, 20B. The saw blade 20A, 20B creates a sawing slit in the workpiece to be machined.

Figure 3:
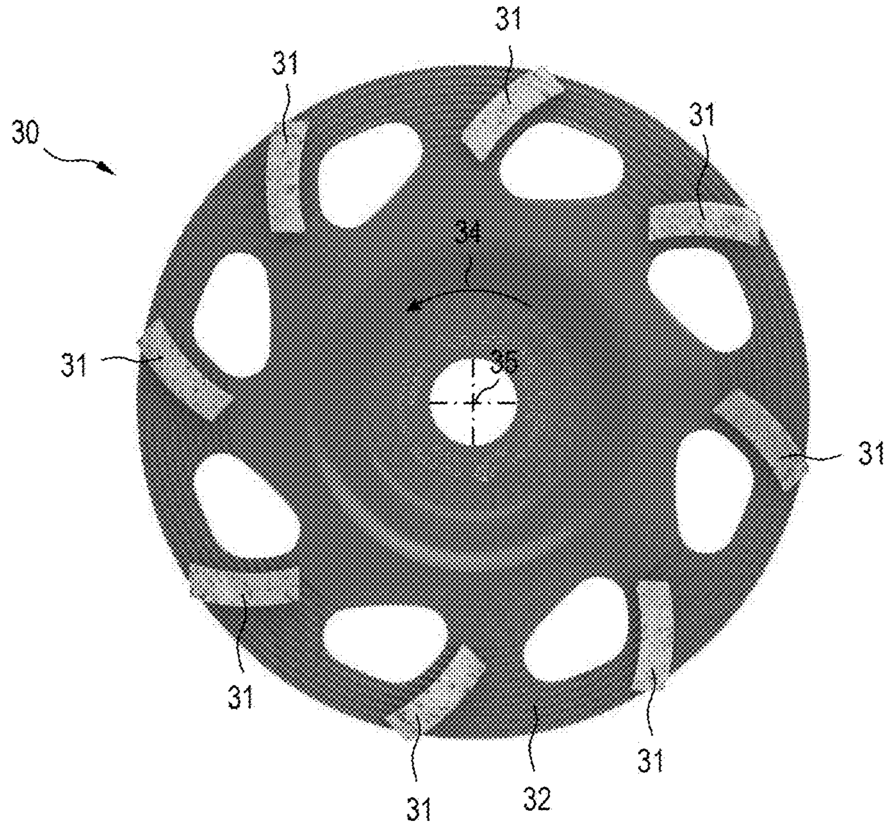
FIG. 3 shows a machining tool taking the form of an abrasive disk.

FIG. 3 shows a machining tool taking the form of an abrasive disk 30. The abrasive disk 30 comprises a number of machining segments 31, a basic body 32 and a tool fitting. The machining segments 31, which are used for abrasive removal, are also referred to as abrading segments, and the disk-shaped basic body 32 is also referred to as a pot. The abrading segments 31 are fixedly connected to the pot 32, for example by screwing, adhesive bonding, brazing or welding.

The abrasive disk 30 is connected via the tool fitting to a tool device and, in abrading operation, is driven by the tool device in a direction of rotation 34 about an axis of rotation 35. During the rotation of the abrasive disk 30 about the axis of rotation 35, the abrasive disk 30 is moved over a workpiece to be machined, the movement running perpendicular to the axis of rotation 35. The abrasive disk 30 removes the surface of the workpiece to be machined.

Figure 4:
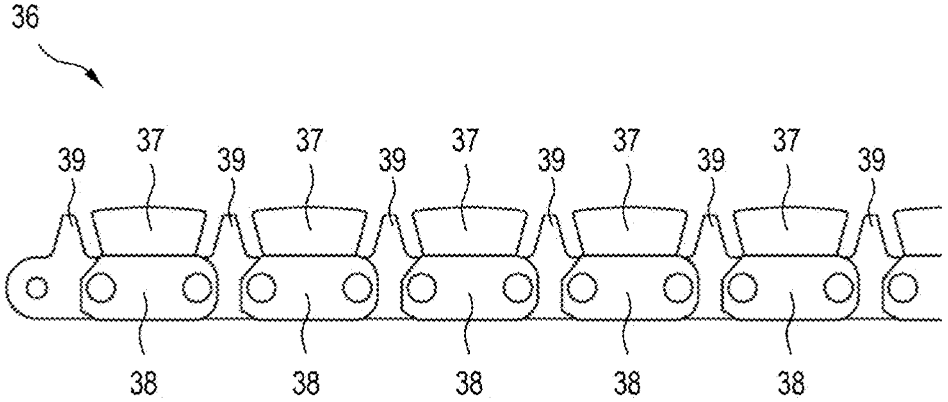
FIG. 4 shows a machining tool taking the form of a cut-off grinding chain.

FIG. 4 shows a machining tool taking the form of a cut-off grinding chain 36. The cut-off grinding chain 36 comprises a number of machining segments 37, a number of basic bodies 38 in the form of links, and a number of connecting links 39. The machining segments 37, which are used for cut-off grinding, are also referred to as cut-off grinding segments and the basic bodies 38 in the form of links are also referred to as driving links.

The driving links 38 are connected via the connecting links 39. In the exemplary embodiment, the connecting links 39 are connected to the driving links 38 via rivet bolts. The rivet bolts allow a rotation of the driving links 38 relative to the connecting links 39 about an axis of rotation which runs through the center of the rivet bolts. The machining segments 37 are fixedly connected to the driving links 38, for example by screwing, adhesive bonding, brazing or welding.

The cut-off grinding chain 36 is connected via a tool fitting to a tool device and, in operation, is driven by the tool device in a direction of rotation. During the rotation of the cut-off grinding chain 36, the cut-off grinding chain 36 is moved into a workpiece to be machined.

Figure 5A:
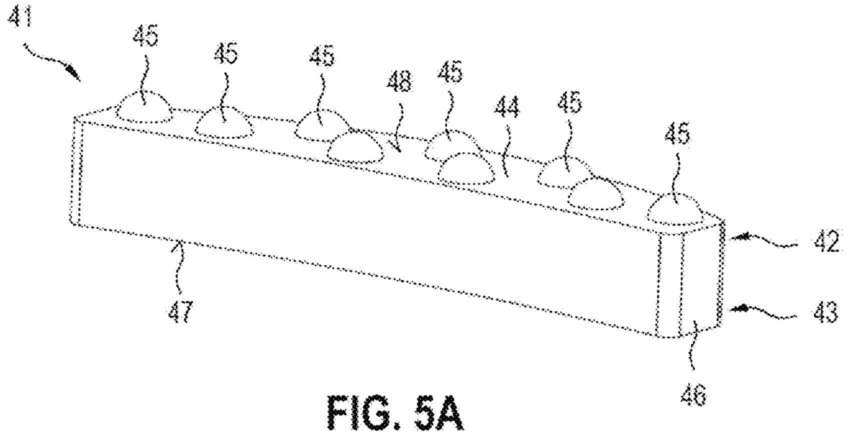
FIGS. 5A-C show a machining segment in a three-dimensional representation (FIG. 5A), in a view of an upper side (FIG. 5B), and in a view of a side surface (FIG. 5C)
Figure 5B:
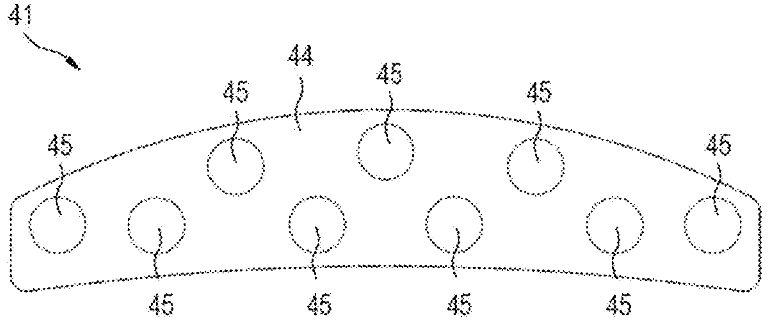
Figure 5C:
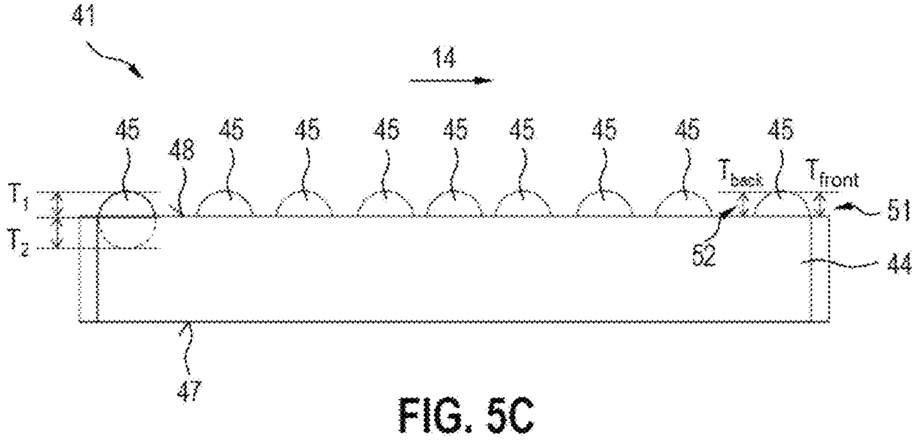

FIGS. 5A-C show a machining segment 41 in a three-dimensional representation (FIG. 5A), in a view of an upper side of the machining segment 41 (FIG. 5B), and in a view of a side surface of the machining segment 41 (FIG. 5C).

The machining segment 41 corresponds in structure and composition to the machining segments 11A, 21A, 21B, 31, 37; the machining segment 11B taking the form of a drilling ring differs from the machining segment 41 by its annular structure. The machining segments can differ from one another in the dimensions and in the curvatures of the surfaces. The basic structure of the machining segments according to the invention is explained on the basis of the machining segment 41 and applies to the machining segments 11A, 11B of FIGS. 1A, 1B, to the machining segments 21A, 21B of FIGS. 2A, 2B, to the machining segment 31 of FIG. 3, and to the machining segment 37 of FIG. 4.

The machining segment 41 is built up from a machining zone 42 and a neutral zone 43. The neutral zone 43 is required if the machining segment 41 is intended to be connected to the basic body of a machining tool; in the case of machining segments which are connected to the basic body for example by brazing or adhesive bonding, the neutral zone 43 can be omitted. The machining zone 42 is built up from a first matrix material 44 and first hard material particles 45, and the neutral zone 43 is built up from a second matrix material 46 without hard material particles.

The term "hard material particles" covers all cutting means for machining segments; these especially include individual hard material particles, composite parts made up of multiple hard material particles, and coated or encapsulated hard material particles. The term "matrix material" covers all materials for building up machining segments in which hard material particles can be embedded. Matrix materials may consist of one material or be composed as a mixture of different materials.

Machining segments which are produced by the method according to the invention for further processing a green body have a layer with first hard material particles 45; further layers with first hard material particles 45 are not provided. "First hard material particles" refer to those hard material particles of the machining segment 41 which, after the production of the machining segment, have on the upper side a projection with respect to the first matrix material 44. Hard material particles which are completely embedded in the first matrix material 44 in the machining segment 41 do not come under the definition of the first hard material particles.

The machining segment 41 is connected by an underside 47 to the basic body of the machining tool. In the case of machining segments for core drilling and in the case of machining segments for abrasive removal, the underside of the machining segments is generally formed as planar, whereas the underside in the case of machining segments for sawing has a curvature in order to be able to fasten the machining segments to the curved end face of the annular or disk-shaped basic body.

The first hard material particles 45 are arranged in the first matrix material 44 according to a defined particle pattern (FIG. 5B) and have on an upper side 48, opposite from the underside 47, of the machining segment 41 a projection Ti with respect to the first matrix material 44. In the exemplary embodiment of FIGS. 5A-C, the machining segment 41 comprises a number of 9 first hard material particles 45 which project on the upper side 48. The number of the first hard material particles 45 and the defined particle pattern in which the first hard material particles 45 are arranged in the first matrix material 44 are adapted to the requirements of the machining segment 41.

The first hard material particles 45 generally derive from a particle distribution which is characterized by a minimum diameter, a maximum diameter and an average diameter. On account of the particle distribution of the first hard material particles 45 between the minimum and maximum diameter, the projections of the first hard material particles 45 can vary correspondingly. In the exemplary embodiment, all first hard material particles 45 have a projection of more than 400 μm with respect to the surrounding first matrix material 44.

The machining tools according to the invention that are shown in FIGS. 1A, 1B, FIGS. 2A, 2B, FIG. 3 and FIG. 4 and are intended for the machining of concrete materials have a defined direction of rotation. When considered in the direction of rotation of the machining tool, a distinction can be drawn between a front-side region and a rear-side region of a hard material particle 45. On account of its geometry with a planar underside, the machining segment 41 is suitable as a drilling segment for the core drill bit 10A.

The direction of rotation 14 of the core drill bit 10A defines a front-side region 51 and a rear-side region 52. The machining of concrete materials occurs in the front-side regions 51 of the first hard material particles 45, and the machining rate depends substantially on the size of the projection of the first hard material particles 45 in the front-side regions 51. The first hard material particles 45 have in the front-side region 51 a front-side projection $T_{front}$ and in the rear-side region a rear-side projection $T_{back}$, which correspond in the exemplary embodiment. Alternatively, the first hard material particles 45 may have different front-side projections $T_{front}$ and rear-side projections $T_{back}$.

The machining segment 41 is produced from a green body 53 which is further processed to form the machining segment 41. In a first embodiment, the green body 53 is compressed to form a compact body 54, which is further processed to form the machining segment 41, and, in a second embodiment, the green body 53 is further processed directly to form the machining segment 41.

Figure 6A:
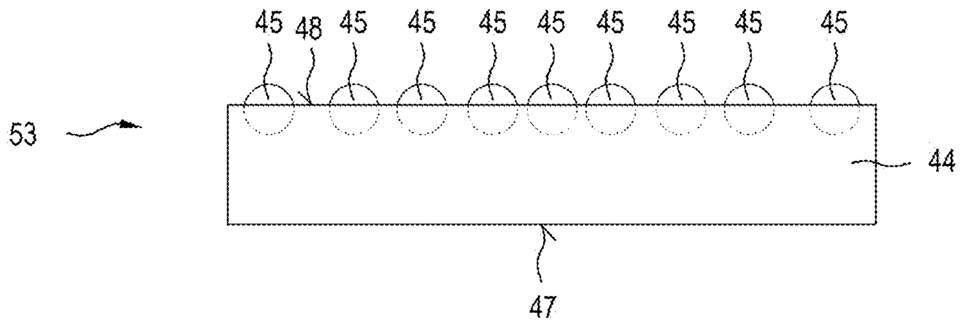
FIGS. 6A, 6B show the production of the machining segment of FIGS. 5A-C from a green body (FIG. 6A), which is compressed in one embodiment to form a compact body (FIG. 6B)
Figure 6B:
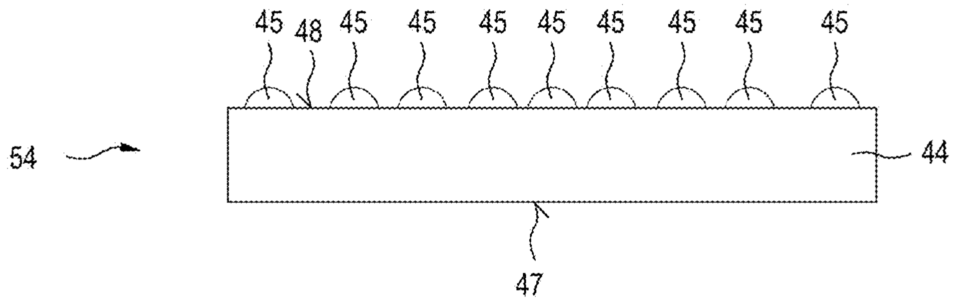

FIGS. 6A, 6B show the green body 53 which is built up from the first matrix material 44 and the first hard material particles 45, and the compact body 54 which is produced by compressing the green body 53. The green body 53 is compacted under the action of pressure until the compact body 54 has substantially the final geometry of the machining segment 41. Examples of suitable methods for achieving an action of pressure on the green body 53 are cold-pressing methods or hot-pressing methods. In the case of cold-pressing methods, the green body 53 is exclusively subjected to an action of pressure, while in the case of hot-pressing methods the green body 53 is subjected not only to the action of pressure but also to an action of temperature up to temperatures of about 200° C. The compact body 54 is further processed under the action of temperature, for example during sintering or by infiltration, to form the machining segment 41.

Figure 7A:
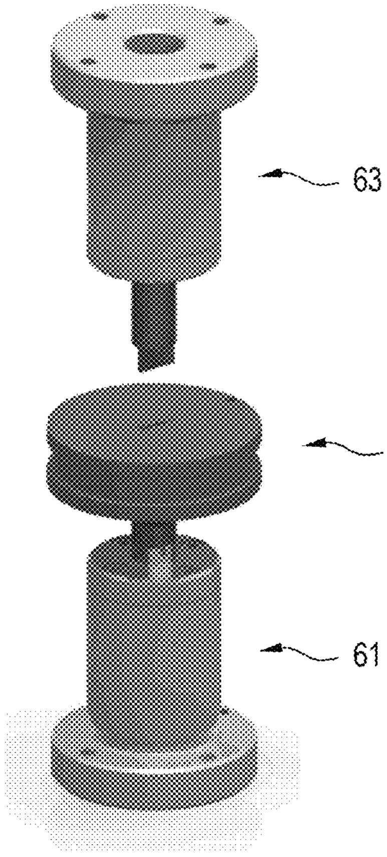
FIGS. 7A-7C show some tool components that are used during the further processing of the green body of FIG. 6A to form the machining segment of FIGS. 5A-C.
Figure 7B:
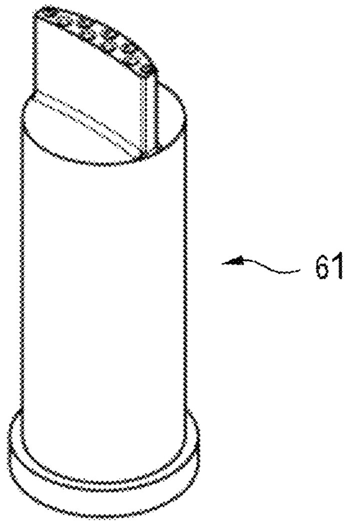
Figure 7C:
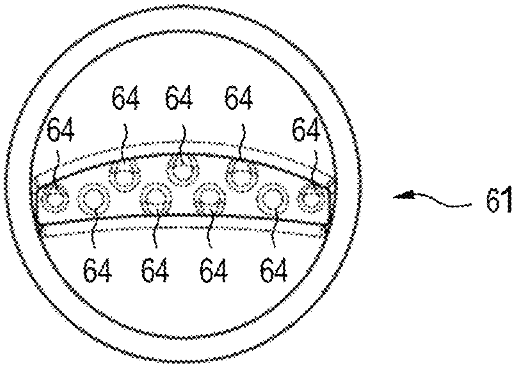

FIGS. 7A-C show some tool components that are used during the production of the green body 53 and during the further processing of the green body 53 to form the machining segment 41. The tool components include a lower punch 61, a die-plate 62 and an upper punch 63, the lower punch 61 also being referred to as the first press punch and the upper punch 63 as the second press punch. FIGS. 7B and 7C show the lower punch 61 in detail.

The green body 53 is built up in the die-plate 62 with a cross-sectional area that corresponds to the desired geometry of the green body 53. The die-plate 62 has on the underside a first opening, into which the lower punch 61 can be moved, and on the upper side a second opening, into which the upper punch 63 can be moved. The bottom punch 61 has depressions 64 in a pressing surface which are arranged to correspond to the defined particle pattern of the first hard material particles 45.

The green body 53 is built up from the top down, that is to say from the upper side 48 to the underside 47. The first hard material particles 45, which in the case of the machining segment 41 protrude on the upper side 48 and machine the concrete material, are placed in the depressions 64 of the lower punch 61. The first matrix material 44 is applied to the placed first hard material particles 45, wherein the first matrix material 44 can be applied in one layer or in a number of layers. The first matrix material 44 is poured into the die-plate 62 by means of a filling shoe until the desired filling height is reached. The further processing of the green body 53 to form the machining segment 41 can occur by compressing and sintering or infiltration or alternatively by hot-pressing. The tool components 61, 62, 63 can be used during compression or during hot-pressing.

The depressions 64 in the pressing surface of the lower punch 61 have an arrangement which corresponds to the defined particle pattern of the first hard material particles 45. The use of the special bottom punch 61 which has depressions for the first hard material particles 45 makes it possible for the green body 53 to be compressed to form a compact body 54 or to be further processed to form the finished machining segment 41 without the projection of the first hard material particles 45 with respect to the first matrix material 44 being removed. By means of the special lower punch 61, the machining segments 41 that are suitable for the dry machining of concrete materials can be produced.

With direct contact between the first hard material particles 45 and the depressions 64 of the lower punch 61, increased wear of the lower punch 61 may occur. In order to reduce the wear of the lower punch 61, direct contact of the first hard material particles 45 with the lower punch 61 should be avoided. Suitable measures are the application of a protective layer into the depressions 64 before the placement of the first hard material particles 45 and/or the use of encased first hard material particles.

Prior to placing the first hard material particles 45, a protective layer of the first matrix material 44 can be applied into the depressions 64 of the bottom punch 61. Alternatively, a protective layer of a second matrix material may be applied into the depressions 64 of the lower punch 61, the second matrix material being different from the first matrix material 44. When a second matrix material that is different from the first matrix material 44 is used, matrix materials with different wear properties can be used. The second matrix material serves for protecting the bottom punch 61 when compressing or hot-pressing the green body 53 and should be able to be removed as quickly as possible from the finished machining segment in order to expose the first hard material particles 45 which machine the base material. A second matrix material with a higher wear rate than the first matrix material 44 can be removed quickly.

The use of encased first hard material particles has the advantage that the first hard material particles 45 do not come into direct contact with the lower punch 61, and the wear of the lower punch 61 can be reduced. The first matrix material 44 can be used as the casing material for the first hard material particles 45. Alternatively, a second matrix material may be used as the casing material for the first hard material particles 45, the second matrix material being different from the first matrix material 44. When a casing material that is different from the first matrix material 44 is used, matrix materials with different wear properties can be used. The casing material serves for protecting the lower punch 61 during compaction and should be removed as quickly as possible from the finished machining segment in order to expose the first hard material particles 45 that machine the concrete material.

Depending on the wear properties of the first matrix material 44, increased wear of the first matrix material 44 on the side surfaces of the machining segment can occur during the machining of a base material with the machining segment 41 as a result of friction with the base material. This wear can be reduced by second hard material particles. The second hard material particles may be admixed with the first matrix material 44 as randomly distributed particles, or the second hard material particles are placed in the first matrix material 44 according to a defined second particle pattern. The second hard material particles are placed in particular in the region of the side surfaces of the machining segment 41.

The invention claimed is:

1. A method for producing a green body for a machining segment, wherein the machining segment is connectable to a basic body of a machining tool by an underside of the machining segment, comprising the steps of:

placing first hard material particles in a defined particle pattern in respective depressions of a first press punch, wherein the depressions have an arrangement which corresponds to the defined particle pattern of the first hard material particles and wherein a number of the first hard material particles that are placed in the defined particle pattern in the respective depressions of the first press punch is equal to a number of the depressions of the first press punch;

applying a first matrix material to the first hard material particles that are placed in the defined particle pattern in the depressions that have the arrangement which corresponds to the defined particle pattern of the first press punch; and applying a layer of the first matrix material into the depressions of the first press punch prior to the placing of the first hard material particles in the depressions such that there is no direct contact between the first hard material particles and the first press punch.

2. The method as claimed in claim 1 further comprising the step of admixing second hard material particles with the first matrix material, wherein an average particle diameter of the second hard material particles is less than an average particle diameter of the first hard material particles.

3. A method for producing a green body for a machining segment, wherein the machining segment is connectable to a basic body of a machining tool by an underside of the machining segment, comprising the steps of:

placing first hard material particles in a defined particle pattern in respective depressions of a first press punch, wherein the depressions have an arrangement which corresponds to the defined particle pattern of the first hard material particles and wherein a number of the first hard material particles that are placed in the defined particle pattern in the respective depressions of the first press punch is equal to a number of the depressions of the first press punch;

applying a first matrix material to the first hard material particles that are placed in the defined particle pattern in the depressions that have the arrangement which corresponds to the defined particle pattern of the first press punch; and applying a layer of a second matrix material into the depressions of the first press punch prior to the placing of the first hard material particles in the depressions, wherein the second matrix material is different from the first matrix material, such that there is no direct contact between the first hard material particles and the first press punch.

4. The method as claimed in claim 3 further comprising the step of admixing second hard material particles with the first matrix material, wherein an average particle diameter of the second hard material particles is less than an average particle diameter of the first hard material particles.

5. A method for producing a green body for a machining segment, wherein the machining segment is connectable to a basic body of a machining tool by an underside of the machining segment, comprising the steps of:

placing first hard material particles in a defined particle pattern in respective depressions of a first press punch, wherein the depressions have an arrangement which corresponds to the defined particle pattern of the first hard material particles and wherein a number of the first hard material particles that are placed in the defined particle pattern in the respective depressions of the first press punch is equal to a number of the depressions of the first press punch;

applying a first matrix material to the first hard material particles that are placed in the defined particle pattern in the depressions that have the arrangement which corresponds to the defined particle pattern of the first press punch; and encasing the first hard material particles with a casing material that comprises the first matrix material such that there is no direct contact between the first hard material particles and the first press punch.

6. The method as claimed in claim 5 further comprising the step of admixing second hard material particles with the first matrix material, wherein an average particle diameter of the second hard material particles is less than an average particle diameter of the first hard material particles.

7. A method for producing a green body for a machining segment, wherein the machining segment is connectable to a basic body of a machining tool by an underside of the machining segment, comprising the steps of:

placing first hard material particles in a defined particle pattern in respective depressions of a first press punch, wherein the depressions have an arrangement which corresponds to the defined particle pattern of the first hard material particles and wherein a number of the first hard material particles that are placed in the defined particle pattern in the respective depressions of the first press punch is equal to a number of the depressions of the first press punch;

applying a first matrix material to the first hard material particles that are placed in the defined particle pattern in the depressions that have the arrangement which corresponds to the defined particle pattern of the first press punch; and encasing the first hard material particles by a casing material that is different from the first matrix material such that there is no direct contact between the first hard material particles and the first press punch.

8. The method as claimed in claim 7 further comprising the step of admixing second hard material particles with the first matrix material, wherein an average particle diameter of the second hard material particles is less than an average particle diameter of the first hard material particles.

* * * * *